United States Patent [19]
Twinam

[11] Patent Number: 5,945,146
[45] Date of Patent: Aug. 31, 1999

[54] FRESH VEGETABLE PRODUCT HAVING LONG SHELF LIFE AND METHOD OF MAKING THEREOF

[76] Inventor: Jerry Richard Twinam, 924 Blackburn Ave., Ashland, Ky. 41101

[21] Appl. No.: 08/891,812

[22] Filed: Jul. 14, 1997

[51] Int. Cl.$^6$ .................................................. A23L 3/34
[52] U.S. Cl. ........................ 426/324; 426/321; 426/615; 426/654; 426/637; 426/442; 426/482; 426/392; 426/418; 426/419; 426/518
[58] Field of Search ..................... 426/267, 268, 426/270, 310, 321, 324, 331, 333, 541, 637, 615, 654, 442, 482, 518, 418, 419, 392

[56] References Cited

U.S. PATENT DOCUMENTS

| | | | |
|---|---|---|---|
| 3,987,208 | 10/1976 | Rahman et al. | 426/541 X |
| 4,097,612 | 6/1978 | Powrie et al. | 426/269 |
| 4,476,112 | 10/1984 | Aversano | 426/654 X |
| 4,549,478 | 10/1985 | Entes | 426/506 X |
| 4,818,549 | 4/1989 | Steiner et al. | 426/267 |
| 4,937,085 | 6/1990 | Cherry et al. | 426/269 |
| 4,962,777 | 10/1990 | Bell | 99/517 X |
| 4,988,522 | 1/1991 | Warren | 426/268 |
| 4,988,523 | 1/1991 | Gardner et al. | 426/268 |
| 5,126,153 | 6/1992 | Beck | 426/269 |
| 5,162,127 | 11/1992 | Weiss et al. | 426/268 |
| 5,226,972 | 7/1993 | Bell | 426/518 X |
| 5,279,843 | 1/1994 | Zomorodi | 426/234 |
| 5,320,772 | 6/1994 | Tricca | 426/321 X |
| 5,346,712 | 9/1994 | Cherry et al. | 426/321 |
| 5,389,389 | 2/1995 | Beck | 426/269 |
| 5,425,308 | 6/1995 | Dickerson et al. | 426/506 X |
| 5,547,693 | 8/1996 | Krockta et al. | 426/267 X |
| 5,622,741 | 4/1997 | Stubbs et al. | 426/243 |

*Primary Examiner*—Milton Cano
*Attorney, Agent, or Firm*—Hunton & Williams

[57] ABSTRACT

A fresh vegetable product having long shelf life is made from fresh vegetables which are cleaned and, if desired, peeled and/or subdivided, and contacted with a chemical mixture of the invention. The chemical mixture may include sodium acid pyrophosphate, calcium chloride, citric acid, potassium sorbate and, optionally, L-ascorbic acid. If the fresh vegetables are susceptible to discoloration upon exposure to air, e.g., peeled potatoes, the chemical mixture also includes sodium bisulfite in relatively small amounts. The contact of vegetables with air is minimized and preferably prevented during the process of the invention. The resulting fresh vegetable product has low sulfite content and is suitable for immediate consumption or further processing (such as cooking) without additional preparation.

26 Claims, 3 Drawing Sheets

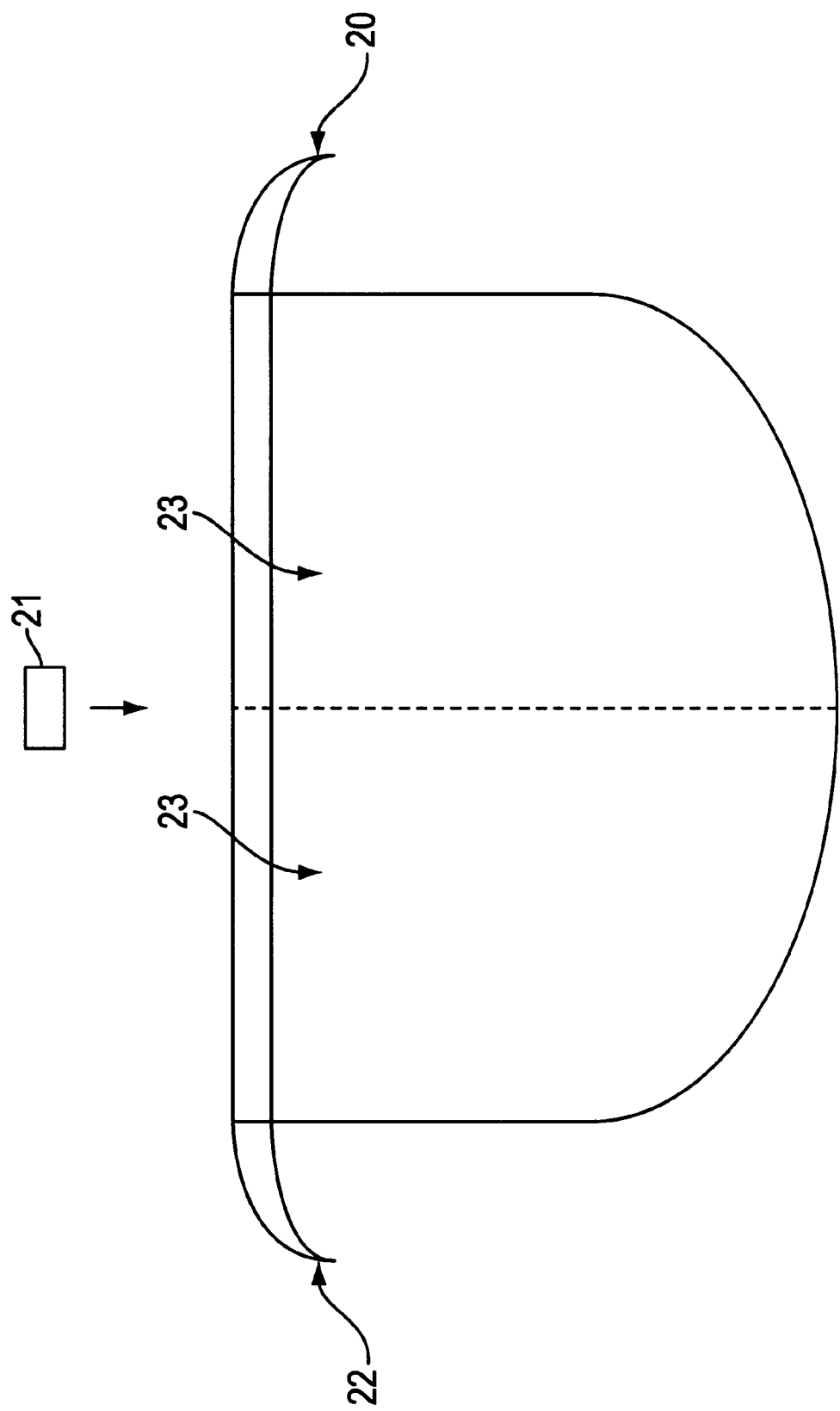

FRESH VEGETABLE PRODUCT HAVING LONG SHELF LIFE AND METHOD OF MAKING THEREOF

I. BACKGROUND OF THE INVENTION

1. Field of the Invention

The invention relates to a fresh vegetable product which has a relatively long shelf life and low content of sulfiting agents (such as sodium bisulfite) and to a method (or process) of production thereof. The invention also relates to a chemical mixture used in the process for making the fresh vegetable product.

2. Background of the Invention

From the moment of harvest, vegetables undergo progressive deterioration which results in the progressive loss of taste and appearance. Efforts have been made in the past to prolong the time that vegetables retain their fresh taste and appearance. Such efforts have included refrigerating vegetables and treating them with preservatives. The deterioration of taste and appearance is accelerated when a vegetable is subdivided, such as by cutting, or otherwise physiologically injured, for example, by removing its skin. A brown or black discoloration may appear at the site of the cut or injury within a relatively short period of time. The discoloration of vegetables as a result of subdivision and possible other preparations for human consumption is a problem of significant economic importance in the food industry. The discoloration of such vegetable matter is unsightly and unappetizing and is associated in the public's mind with distastefully old vegetables, which are perceived to be unsuitable for consumption.

This problem has become more pronounced as the demand for fresh whole and subdivided vegetables has been steadily increasing over the years due to the popularity of salad bars in eating establishments and consumers' demand for convenience food items. Such convenience items include whole and subdivided vegetables which, as purchased, are suitable for consumption, or for further processing by consumers. Further processing by consumers includes, for example, cooking or grilling of the vegetables.

The increased consumer demand for greater availability of such fresh, whole and subdivided vegetables immediately suitable for consumption or further processing has been underscored by the consumers' health consciousness. Consumers demand the availability of fresh, whole and subdivided vegetables which retain their fresh taste and do not have a substantially higher calorie or fat content than freshly harvested vegetables. Thus, consumers express a strong preference for fresh instead of frozen or deep fried vegetables. Several proposals have been made for providing fresh (not frozen) subdivided vegetables which retain their fresh appearance and flavor. For example, it has been proposed to vacuum-cool produce where it is cooled in a reduced pressure environment prior to packaging. Such a method lengthens the shelf life of the produce and may slow the growth of bacteria and fungi. However, this method is relatively expensive.

Bell, U.S. Pat. No. 5,226,972, suggests washing subdivided fresh produce with water that preferably comprises an oxidizing agent, such as chlorine or a chloride, at a sufficiently high temperature and for a time sufficient to remove such deterioration-causing agents as bacteria and fungi and liquids and solids emitted by the produce itself. The wash water temperature is preferably about 55° to about 70° F.

It has also been proposed to contact subdivided, fresh produce with numerous agents, e.g., sulfiting agents, such as sodium bisulfite, in relatively large amounts, such that the final vegetable product has a sulfite concentration of about 10 percent by weight. However, the use of such relatively large amounts of bisulfite imparts undesirable off-taste to the vegetables. As a result, relatively large amounts of sugar, such as dextrose, have to be added to the vegetables to neutralize the off-taste. The large amounts of sugar, in turn, impart an undesirable sweet taste to the vegetables.

Various other agents and processes have been proposed for minimizing spoilage and browning of vegetables. Thus, Beck, U.S. Pat. No. 5,126,153, and Beck, U.S. Pat. No. 5,389,389, disclose methods for treating produce to minimize browning upon subsequent processing, handling and/or storage including exposing the produce (such as fruits and vegetables, e.g., potatoes) to discoloration inhibitors, including cysteine, calcium chloride, sodium acid pyrophosphate, and/or a sulfiting agent in such amounts that a treated product contains less than about 30 ppm sulfite and preferably less than about 10 ppm or essentially no sulfite. After the treatment with the discoloration inhibitors, the product is preferably subjected to a dehydration step to form a dehydrated, storage-stable product.

Dickerson, et. al., U.S. Pat. No. 5,425,308, discloses an apparatus and method for slicing potatoes and washing or coating potato slices with water or a solution of various known treating materials, such as chemical preservatives, e.g., bisulfite, additives, etc. The apparatus and method include two concentric rings (FIGS. 1 and 4) which spray high pressure water or a solution of chemicals. The resulting washed, cut potatoes are usually conveyed to a next processing station, usually a fryer or oven.

Gardner et. al., U.S. Pat. No. 4,988,523, disclose a process for treating fresh peeled potatoes and other peeled vegetables and fresh peeled fruits, including preserving the vegetables or fruits, by a first dipping process or spraying, employing a mixture of a commercial preservative, e.g., SPORIX™, and citric acid. After trimming, the peeled vegetables or fruits are subjected to a second exposure of the same solution and thereafter they are packaged and refrigerated for up to 12 days without exhibiting discoloration or purification. According to Gardner et al., SPORIX™ is characterized as an acid sodium metaphosphate.

Weiss et. al., U.S. Pat. No. 5,162,127, disclose a process for treating foodstuffs subject to oxidative or enzymatic discoloration, such as fruits, vegetables, and cereal grains, comprising contacting such foodstuffs with an aqueous solution of a hydrolysis mixture of aldonic acid and its lactones or a precursor thereof and very small quantities of a sulfiting agent. The processing usually takes place at an ambient temperature of about 50–70° F., but elevated temperatures may also be utilized, e.g., 110° or even 180° F.

Cherry, et. al., U.S. Pat. No. 4,937,085, discloses the treatment of white, cut potatoes to prevent blackening thereof. The treatment includes contacting the white, cut potatoes with a combination of citric acid and cysteine. The combination optionally also includes ethylenediamine tetraacetic acid (EDTA).

However, none of the methods discussed above provides fresh (i.e., not previously frozen) vegetables that are cleaned, and that substantially taste like fresh vegetables even after a relatively long period of time, and that are suitable for immediate consumption by the consumer or for further processing.

II. SUMMARY OF THE INVENTION

Accordingly, it is a primary object of the invention to provide a fresh vegetable product which has not been previously frozen and which is suitable for substantially immediate consumption or further processing by consumers. The fresh vegetable product is substantially free of discoloration and retains a substantially fresh vegetable appearance, taste and smell for a relatively long period of time. The fresh vegetable product of the invention may comprise either whole or subdivided vegetables.

It is another object of the invention to provide a process for producing the aforementioned, fresh vegetable product (which has not been previously frozen) suitable for substantially immediate consumption or further processing by consumers, which is conducted at a relatively low cost.

In particular, the invention is directed to a process for manufacturing a fresh vegetable product suitable for consumption or further processing, which comprises several steps. In the first step, the fresh vegetables are cleaned, e.g., with water. In general, it is preferred that the water used in all steps of the process is either purified water or distilled water. If the nature of the vegetables is such that they need to be peeled prior to consumption by humans, the vegetables are peeled after the cleaning step but before any subsequent process steps. The peeling step is conducted with vegetables substantially completely covered by water.

After the vegetables are cleaned and peeled (if desired), they are contacted with a chemical mixture of the invention. The nature of the chemical mixture and the method of contacting the vegetables with it depends on the vegetable's susceptibility to discoloration upon the exposure to air. If they are not greatly susceptible to such a discoloration ("vegetables not susceptible to discoloration"), the chemical mixture ("chemical mixture I") includes sodium acid pyrophosphate (SAP), calcium chloride and potassium sorbate. Optionally, the chemical mixture I may also include L-ascorbic acid (also known as "ascorbic acid"). SAP may be substituted by disodium acid pyrophosphate (DAP), or a mixture of SAP and DAP may also be used. It is also possible to use magnesium chloride or a mixture of magnesium chloride and calcium chloride instead of calcium chloride. A single aqueous solution of the chemical mixture I is used in the process for contacting the vegetables not susceptible to discoloration. Such a solution comprises about 0.5 to about 12% by weight, preferably about 0.5 to about 9% by weight, and most preferably about 0.5 to about 6% by weight of the chemical mixture I. In one preferred embodiment, the aqueous solution of the chemical mixture I comprises about 0.70 to about 1.1% by weight of the chemical mixture I.

If the vegetables are more susceptible to discoloration upon contact with air ("vegetables susceptible to discoloration", e.g., peeled potatoes), the chemical mixture ("chemical mixture II") comprises sodium acid pyrophosphate, calcium chloride, citric acid, L-ascorbic acid, sodium bisulfite and potassium sorbate. In the chemical mixture II, SAP may also be substituted by DAP, or by a mixture of SAP and DAP. It is possible to eliminate sodium bisulfite by adding additional sodium acid pyrophosphate and/or additional calcium chloride. But, the elimination of sodium bisulfite decreases the shelf life of the fresh vegetable product of the invention. It is also possible to use magnesium chloride or a mixture of magnesium chloride and calcium chloride instead of calcium chloride. Initially, the vegetables susceptible to discoloration are contacted with a diluted aqueous solution of the chemical mixture II, and then with a concentrated aqueous solution of the chemical mixture II. The diluted aqueous solution of the chemical mixture II comprises about 1/40 of the amount of the chemical mixture II contained in the concentrated aqueous solution of the chemical mixture II. The diluted aqueous solution of the chemical mixture II comprises about 0.05 to about 0.3% by weight, preferably about 0.10 to about 0.23 by weight, and most preferably about 0.1 to about 0.15% by weight of the chemical mixture II. The concentrated aqueous solution of the chemical mixture II comprises about 2 to about 12% by weight, preferably about 4 to about 9% by weight, and most preferably about 4 to about 6% by weight of the chemical mixture II. In one preferred embodiment, the diluted aqueous solution of the chemical mixture II comprises about 0.085% of the chemical mixture II and the concentrated aqueous solution about 2 to about 3.4% by weight of the chemical mixture II.

Although potatoes are more susceptible to discoloration upon exposure to air, chemical mixture I may still be used to treat potatoes, although the use of chemical mixture RI on potatoes is preferred. In addition, although it is preferable to use chemical mixture II on vegetables that are not susceptible to discoloration upon exposure to air, chemical mixture II can also be used on vegetables that are not susceptible to discoloration upon exposure to air.

After the contact with the chemical mixture I or the chemical mixture II, respectively, the fresh vegetables are washed, preferably with water. Thereafter, the fresh vegetables are at least partially dried and packaged.

If it is desired to produce a fresh, subdivided vegetable product that is not peeled, the vegetables are subdivided after the cleaning step but before any other process step. If it is desired to produce a fresh subdivided vegetable product that is peeled, the vegetables are subdivided after the peeling step, but prior to any other process step.

The invention is also directed to a fresh vegetable product suitable for consumption or further processing which is made by a process comprising the following steps. In the first step, the vegetables are cleaned, preferably with water. If it is desired that the vegetables be peeled prior to consumption, they are peeled in a second step, after the first step, but prior to any other process step, while they are substantially completely covered by water.

In the next step, the vegetables are contacted with the chemical mixture I, if they are not susceptible to discoloration upon exposure to air. A single aqueous solution of the chemical mixture I is used in the process. This solution includes about 0.5 to about 12% by weight, preferably about 0.5 to about 9% by weight, and most preferably about 0.5 to about 6% by weight of the chemical mixture I.

If the vegetables are susceptible to discoloration upon exposure to air, they are contacted with the chemical mixture II. If the vegetables are subdivided, they are initially contacted with a diluted aqueous solution of the chemical mixture II, and then with a concentrated aqueous solution of the chemical mixture II. The diluted aqueous solution of the chemical mixture II includes about 0.05 to about 0.3% by weight, preferably about 0.1 to about 0.225% by weight, and most preferably about 0.1 to about 0.15% by weight of the chemical mixture II. The concentrated aqueous solution of the chemical mixture II comprises about 2 to about 12% by weight, preferably about 4 to about 9% by weight, and most preferably about 4 to about 6% by weight of the chemical mixture II in distilled water. If they are not subdivided, they are contacted only with the concentrated aqueous solution.

In the next step, the vegetables (whether or not susceptible to discoloration) are washed preferably with water, and then they are at least partially dried. The partially dried vegetables are packaged to obtain the fresh vegetable product.

If it is desired to produce a fresh, subdivided vegetable product and it is not desired that the vegetables be peeled, the vegetables are subdivided after the cleaning step but before any other process step. If it is desired to produce a fresh subdivided vegetable product and it is desired that the vegetables be peeled, they are subdivided after the peeling step, but prior to any other step.

Another embodiment of the invention is directed to the chemical mixture I comprised of SAP, calcium chloride, citric acid and potassium sorbate. The chemical mixture I may also optionally comprise L-ascorbic acid. SAP may be substituted by DAP, or by a mixture of SAP and DAP. Calcium chloride may be substituted by magnesium chloride or by a mixture of calcium chloride and magnesium chloride. The chemical mixture I is preferably used for treating vegetables which are not susceptible to discoloration upon exposure to air.

The invention is also directed to the chemical mixture II comprised of SAP, calcium chloride, citric acid, L-ascorbic acid, sodium bisulfite and potassium sorbate. The chemical mixture II is preferably used for treating vegetables which are susceptible to discoloration upon exposure to air, such as potatoes.

In the chemical mixture II, SAP may be substituted by DAP or by a mixture of SAP and DAP. Calcium chloride may be substituted by magnesium chloride or by a mixture of calcium chloride and magnesium chloride. Sodium bisulfite may be eliminated by increasing the amounts of sodium acid pyrophosphate and/or calcium chloride.

Another embodiment of the invention is directed to a fresh vegetable product which comprises SAP, calcium chloride, citric acid and potassium sorbate. The fresh vegetable product may also comprise L-ascorbic acid. Such a fresh vegetable product may also comprise, instead of SAP, DAP or a mixture of SAP and DAP. This vegetable product may also include, instead of calcium chloride, magnesium chloride or a mixture of calcium chloride and magnesium chloride. Such a fresh vegetable product is generally made from vegetables which, prior to their treatment in the process of this invention, are not susceptible to discoloration upon exposure to air, such as carrots, beans, onions or celery.

Another embodiment of the invention is directed to a fresh vegetable product which includes SAP, calcium chloride, citric acid, potassium sorbate, L-ascorbic acid and sodium bisulfite. In such a fresh vegetable product, SAP may be substituted by DAP or by a mixture of SAP and DAP. Calcium chloride may be substituted by magnesium chloride or by a mixture of calcium chloride and magnesium chloride. Sodium bisulfite may be eliminated by increasing the content of sodium acid pyrophosphate and/or calcium chloride in the fresh vegetable product. Such a fresh vegetable product is made from vegetables which, prior to their treatment in the process of this invention, are susceptible to discoloration upon exposure to air, such as potatoes.

The embodiments described above provide several advantages. The embodiments directed to a fresh vegetable product made from vegetables susceptible to discoloration upon exposure to air have relatively low or no sulfite content, making such a fresh vegetable product acceptable to individuals who may be sensitive or allergic to sulfites. The fresh vegetable product has a relatively long shelf life and natural, fresh vegetable taste. The fresh vegetable product is also convenient and easy to use in food preparation because it does not require cleaning, peeling or defrosting by the consumer.

III. BRIEF DESCRIPTION OF THE DRAWINGS

FIG. 2 is a top view of one embodiment of a display case which may be used to display and market the fresh vegetable product of the invention.

Figure 1A:
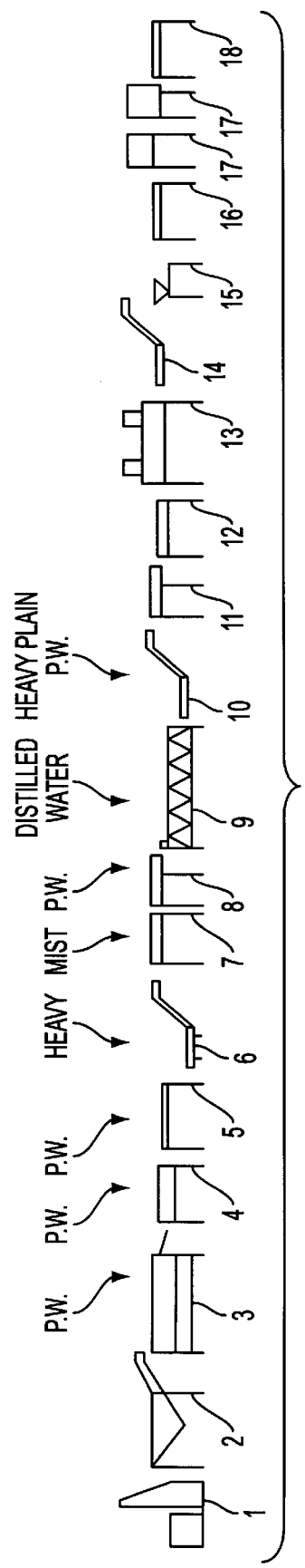
FIG. 1 is a schematic flow chart of one embodiment of a process for making a fresh vegetable product of the invention.

IV. DETAILED DESCRIPTION OF THE INVENTION a. Definitions

The term "fresh vegetable product" means that the vegetables used to make that product were never frozen or fully cooked. It is expressly contemplated that "fresh vegetable product" may mean that the vegetables used to make that product were partially cooked or browned in the process of the invention at about 375° to about 425° F. for about 2 to about 5 minutes. Such a partial cooking or browning step may be referred to as "blanching."

The term "subdivided" means that the vegetables are divided into smaller pieces, by such techniques as cutting, slicing, chopping or dicing.

The term "purified water" means water which has been filtered through a filter system, which might include a charcoal filter.

The term "distilled water" means water which has been boiled to a vapor and then condensed to a liquid state.

The term "substantially completely covered by water or solution" means that the vegetables are immersed in or covered by water or solution so that they are substantially not exposed to air.

The term "chemical mixtures" refers to all chemical mixtures of this invention, i.e., chemical mixture I, chemical mixture II, chemical mixture IIA (discussed below).

In this application, whenever the identification of the content of any ingredients in a solution, water, chemical mixture, composition or product is preceded by the term "comprising" or "including", Applicant also contemplates that such a composition, solution, water, chemical mixture or product is to be defined as "consisting essentially of" the same amounts of the corresponding ingredients.

b. Detailed Description

It is important to use in the process vegetables which are as fresh as practicable to obtain the optimal benefits of the invention. Thus, the plant for conducting the process of the invention preferably should be located in close vicinity of the site of where the vegetables are grown to minimize time elapsed from harvesting till the process of the invention is commenced.

The entire process is preferably conducted at a reduced temperature of about 33° to about 55° F., preferably about 33° to about 44° F., more preferably about 33° to about 41° F., and most preferably about 40° F.

The vegetables which are not susceptible to surface discoloration upon exposure to air and which can be used in the process of this invention include carrots, onions, green beans, peppers, such as green, red or yellow peppers, and celery.

The vegetables which are susceptible to surface discoloration upon exposure to air include peeled potatoes. It is preferred to use in most, if not all, steps of the process purified or distilled water to minimize the introduction of any impurities into the product of the process which are not already present in harvested vegetables. Such impurities include bacteria and fungi. It is also preferred to use distilled water to make a solution of a suitable chemical mixture in a solution tank step, discussed below.

In the process, except for the peeling and working steps, whenever the vegetables are injured, for example subdivided (i.e., cut or sliced), they are substantially completely covered by an aqueous solution of a chemical mixture, e.g., an aqueous solution of the chemical mixture I, a diluted aqueous solution of the chemical mixture II or a concentrated aqueous solution of the chemical mixture II. The scrubbing step is used with vegetables such as carrots, usually instead of the peeling step and in the same place in the process as the peeling step.

The vegetables are initially cleaned by any suitable method. Preferably, they are cleaned with water. The water used in the cleaning step may be tap water, purified water or distilled water. However, it is preferred to use purified or distilled water. In the most preferred embodiment, water used in the process after the cleaning step is either purified or distilled water. The water temperature in all steps of the process is maintained at about 35° to about 55° F., preferably about 36° to about 50° F., more preferably about 38° to about 45° F., and most preferably about 40° to about 44° F.

In the next step, the vegetables are transferred to a holding tank containing purified water or distilled water in such an amount that it substantially completely covers the vegetables and substantially prevents or minimizes their exposure to air. In the holding tank, the vegetables are worked, i.e., any blemishes on the surface are removed and any remaining outer skin is removed, for example, by peeling or scrubbing. Instead of using the holding tank, this step may also be conducted under a mist of purified water or distilled water, to substantially minimize or prevent contact of vegetables with air. If this step is conducted under a mist of water, it is carried out on a mesh conveyer belt with a continuous heavy mist or spray of purified or distilled water on the vegetables. The flow of water is such as to substantially cover all the vegetables on the conveyor belt with water to substantially prevent or minimize contact with oxygen. The vegetables are worked on the mesh conveyor belt in the same manner as they are worked in the holding tank. An optional, next step involves subdividing the vegetables, e.g., by cutters standing on either side of the mesh conveyor belt, while purified or distilled water with a solution of a chemical mixture is sprayed onto the vegetables. The cutters are usually operated by individuals standing on either side of the conveyor belt. After the holding tank, or the alternative mesh conveyor belt, the vegetables are transferred to an inspection section, e.g., a roller inspection table, where they are inspected for blemishes, or other deficiencies, such as darkened or injured areas. If the vegetables are peeled before the holding tank (as described below), they would also be inspected at this inspection section for any remaining peels.

Then, the vegetables are transferred to a solution tank (also referred to herein as a "cold water Auger/Chemical Feeder"). They are preferably transferred to the solution tank by a mesh conveyor belt submerged in purified or distilled water so that the vegetables are substantially completely covered by the water to prevent or minimize contact with oxygen. Alternatively, a heavy mist spray of purified or distilled water is applied to the mesh conveyor belt. The water submerging the mesh conveyor belt or the water used for the heavy mist spray applied to the mesh conveyor belt includes a chemical mixture. The solution tank step may be omitted if the desired results can be obtained by spraying the desired chemical mixture on the vegetables.

The subdividing step is conducted while the vegetables are substantially completely covered by purified water including a suitable chemical mixture. If the vegetables are not susceptible to discoloration upon exposure to air, the aqueous solution of chemical mixture I is used in the subdividing step and in the step of transferring the vegetables from the subdividing step (or from the inspection section if the subdividing step is omitted) to the solution tank.

If the vegetables are susceptible to discoloration upon exposure to air, the diluted aqueous solution of the chemical mixture II is used in the subdividing step and in the step of transferring the vegetables from the subdividing step to the solution tank.

The solution tank includes an aqueous solution of a chemical mixture in distilled water. If the vegetables are not susceptible to discoloration upon exposure to air, the solution tank includes the aqueous solution of the chemical mixture I. If the vegetables are susceptible to discoloration upon exposure to air, the solution tank includes the concentrated aqueous solution of the chemical mixture II.

The main purpose of the solution tank is to move the vegetables and to promote good, intimate mixing of the vegetables and the appropriate chemical solution. The solution tank may contain a mesh conveyor belt moving through the tank while a relatively heavy mist of the aqueous solution of the chemical mixture I or the concentrated aqueous solution of the chemical mixture II is sprayed substantially continuously onto the vegetables. In the most preferred embodiment, the solution tank contains a mechanical auger, which turns and mixes the vegetables with the aqueous solution of the chemical mixture I or the concentrated aqueous solution of the chemical mixture II. The vegetables are kept in contact with the aqueous solution of the chemical mixture I in all steps where that mixture is used for about 10 to about 30 minutes, preferably about 15 to about 25 minutes, and most preferably about 18 to about 22 minutes, while being stirred or moved. If the vegetables are treated with the diluted aqueous solution of the chemical mixture II and then with the concentrated aqueous solution of the chemical mixture II, they are kept in contact with the diluted aqueous solution of the chemical mixture II for about 10 to about 30 minutes, preferably about 15 to about 25 minutes, and most preferably for about 18 to about 22 minutes, while being stirred or moved. The vegetables are kept in contact with the concentrated aqueous solution of the chemical mixture II for about 10 to about 30 minutes, preferably about 15 minutes to about 25 minutes, and most preferably about 18 minutes to about 22 minutes. In general, the vegetables are kept in contact with the solution for a time sufficient to produce a fresh vegetable product in accordance with the invention.

After leaving the solution tank, the vegetables are transported to a rinsing step. The rinsing step is preferably carried out on a conveyor belt which has a relatively heavy spray of purified or distilled water applied substantially continuously to the vegetables. No chemical mixture is added to this spray of water. Subsequently, the vegetables are at least partially dried, using any suitable apparatus, and method, such as spin drying, in a drying machine or ambient dryer belt, i.e., a mesh belt having fans blowing air from above and below the belt on the vegetables. The temperature of the air blown by the fans is that which is used in the process of the invention. The contact with air in the drying step is minimized because the vegetables have already been coated with the ingredients of the chemical mixture which protects them to a substantial extent from the deleterious effects of air. The result of the drying step is a fresh vegetable product of the invention.

In the next step, the whole (if the subdividing step was omitted) fresh vegetables or the subdivided fresh vegetables (if the subdividing step was included) are weighed and packaged using conventional vacuum pack machines to package them in barrier bags or airtight plastic containers or to package them using industrial food grade nitrogen, industrial food grade argon or industrial food grade helium. One of the main objectives of the packaging step is to extract substantially all or as much air as possible out of the container or package and to keep the air out of the container for as long as possible. This is believed to be necessary to prevent the discoloration and/or spoilage of the vegetables. The packaging step is also conducted at about 33° to about 55° F., preferably about 33° to about 44° F., more preferably about 33° to about 41° F., and most preferably at about 40° F. The packaged fresh vegetable product is transported to points of distribution or sale in refrigerated trucks at a temperature of about 34 to 50° F., preferably about 35° to 46° F., and most preferably about 36 to 44° F. As in all of the other steps of the process, it is important that the transport temperature is always maintained above the water freezing temperature, i.e., above 32° F.

At the point of sale, the fresh, subdivided (or whole) vegetables should also be held at refrigerated conditions, at substantially the same temperature which is used to transport them from the plant to points of distribution or sale.

If it is desired that the outer skin of the vegetables used to make the vegetable product be removed (e.g., potatoes), they are peeled after the cleaning step, but before any other step of the process. The peeling step is conducted with vegetables substantially completely covered by water. This can be accomplished by several different means. For example, the vegetables can be immersed in water, or a mist of water can be sprayed onto the vegetables continuously to substantially minimize or prevent contact with air. The peeling can be conducted by an automatic peeling machine, or manually.

After the peeling step, the vegetables are transferred to the holding tank, and then to the remaining steps of the process as discussed above.

If it is desired that the vegetables be subdivided, after the holding tank, but before any other step of the process, they are transferred to a subdividing step (or area). While being transferred (or transported) to the subdividing step, the vegetables are also substantially completely covered by purified water or distilled water. Alternatively, a mist of purified or distilled water is sprayed onto the vegetables to substantially cover them with water. The vegetables may be transported by a mesh conveyor belt submerged in purified or distilled water to such a depth that the vegetables are substantially completely covered by water and there is very little, if any, contact of vegetables with air. Alternatively, the mesh conveyor belt is not submerged and a mist of purified or distilled water is continuously sprayed onto the vegetables while they are being transported to the subdividing area. The mist of the purified or distilled water is sprayed onto the vegetables in such a manner that they are substantially completely covered by water to minimize or prevent their exposure to air.

In the subdividing step, the vegetables are also substantially completely covered by the aqueous solution of the chemical mixture I or the diluted aqueous solution of the chemical mixture II. They may be covered by one of such solutions, for example, by having an appropriate solution in mist form sprayed over them during the entire subdividing step. The subdividing step can be conducted using any conventionally-known apparatus for subdividing the vegetables, such as cutters for potatoes.

It may be desired that some vegetables be subdivided and peeled. In such an event, the peeling step is conducted in the manner and in the sequence of steps as discussed above, and the subdividing step is preferably conducted after the holding tank step and the inspection station.

The chemical mixture I comprises:
(a) sodium acid pyrophosphate, about 25 to about 55% by weight, preferably about 27 to about 52% by weight, and most preferably about 31 to about 52% by weight;
(b) calcium chloride, about 15 to about 35% by weight, preferably about 17 to about 32% by weight, and most preferably about 25 to about 32% by weight;
(c) citric acid, about 5 to about 25% by weight, preferably about 6 to about 22% by weight, and most preferably about 8 to about 20% by weight;
(d) potassium sorbate, about 2 to about 15% by weight, preferably about 3 to about 12% by weight, and most preferably about 4 to about 9% by weight; and, optionally
(e) L-ascorbic acid, used for some vegetables, such as string cut green beans or pole beans and green or red peppers in the amount of about 10 to about 20% by weight, most preferably about 16% by weight.

In the chemical mixture I, it is also possible to substitute disodium acid pyrophosphate for sodium acid pyrophosphate. If disodium acid pyrophosphate is used instead of sodium acid pyrophosphate, the content of disodium acid pyrophosphate in the chemical mixture I is about 25 to about 55% by weight, preferably about 27 to about 52% by weight, and most preferably about 31 to about 52% by weight. The remaining ingredients in the chemical mixture I including the disodium acid pyrophosphate comprise:
(b) calcium chloride, about 15 to about 35% by weight, preferably about 17 to about 32% by weight, and most preferably about 25 to about 32% by weight;
(c) citric acid, about 5 to about 25% by weight, preferably about 6 to about 22% by weight, and most preferably about 8 to about 20% by weight;
(d) potassium sorbate, about 2 to about 25% by weight, preferably about 3 to about 12% by weight, and most preferably about 4 to about 9% by weight; and, optionally
(e) L-ascorbic acid in the amount of about 8 to about 22% by weight, preferably about 10 to about 16% by weight, and most preferably about 12 to about 16% by weight.

It is also possible to use a mixture (or blend) of sodium acid pyrophosphate and disodium acid pyrophosphate instead of sodium acid pyrophosphate or disodium acid pyrophosphate, individually. The total amount of the blend in the chemical mixture I is about 25 to about 55% by weight, preferably about 27 to about 52% by weight, and most preferably about 31 to about 52% by weight. The blend comprises approximately equal amounts of SAP and DAP.

The chemical mixture II comprises:
(a) sodium acid pyrophosphate, about 25 to about 68% by weight, preferably about 30 to about 65% by weight, and most preferably about 33 to about 64% by weight;
(b) calcium chloride, about 5 to about 25% by weight, preferably about 8 to about 22% by weight, and most preferably about 10 to about 20% by weight;
(c) citric acid, about 5 to about 25% by weight, preferably about 7 to about 22% by weight and most preferably about 8.5 to about 18% by weight;
(d) L-ascorbic acid, about 2 to about 20% by weight, preferably about 4 to about 18% by weight, and most preferably about 5 to about 16% by weight;
(e) sodium bisulfite, about 0.5 to about 10% by weight, preferably about 0.5 to about 9% by weight, and most preferably about 0.5 to about 8% by weight;
(f) potassium sorbate, about 2 to about 15% by weight, preferably about 2 to about 10% by weight and most preferably about 4 to about 8% by weight.

Without wishing to be bound by any theory of operability, it is believed that sodium bisulfite prevents or substantially eliminates the surface discoloration of vegetables susceptible to such discoloration upon their exposure to air. Examples of such vegetables are peeled potatoes. Further, without wishing to be bound by any theory of operability, L-ascorbic acid (or ascorbic acid) is believed to eliminate the off-taste imparted to such vegetables by the sodium bisulfite.

Alternatively, the vegetables which are susceptible to discoloration upon contact with air may also be contacted with a chemical mixture which comprises disodium acid pyrophosphate instead of sodium acid pyrophosphate. Such an alternative mixture ("chemical mixture IIA") includes the following ingredients:

(a) disodium acid pyrophosphate, about 25 to about 68% by weight, preferably about 30 to about 65% by weight, and most preferably about 33 to about 64% by weight;

(b) calcium chloride, about 5 to about 25% by weight, preferably about 8 to about 22% by weight, and most preferably about 10 to about 20% by weight;

(c) citric acid, about 5 to about 25% by weight, preferably about 7 to about 22% by weight, and most preferably about 8.5 to about 18% by weight;

(d) L-ascorbic acid, about 2 to about 20% by weight, preferably about 4 to about 18% by weight, and most preferably about 5 to about 16% by weight;

(e) sodium bisulfite, about 0.5 to about 10% by weight, preferably about 0.5 to about 9% by weight, and most preferably about 0.5 to about 8% by weight;

(f) potassium sorbate, about 1 to about 15% by weight, preferably about 2 to about 10% by weight, and most preferably about 4 to about 8% by weight. In the chemical mixture II or IIA, it is also possible to use a blend of sodium acid pyrophosphate and disodium acid pyrophosphate instead of sodium acid pyrophosphate or disodium acid pyrophosphate, individually. The blend comprises approximately equal amounts of sodium acid pyrophosphate and disodium acid pyrophosphate.

The total amount of the blend of SAP and DAP included in the chemical mixture II is about 25 to about 68% by weight, preferably about 30 to about 65% by weight, and most preferably about 33 to about 64% by weight. Such a chemical mixture II comprises the following additional ingredients:

(b) calcium chloride, about 5 to about 25% by weight, preferably about 8 to about 22% by weight, and most preferably about 10 to about 20% by weight;

(c) citric acid, about 5 to about 25% by weight, preferably about 7 to about 22% by weight, and most preferably about 8.5 to about 18% by weight;

(d) L-ascorbic acid, about 2 to about 20% by weight, preferably about 4 to about 18% by weight, and most preferably about 5 to about 16% by weight;

(e) sodium bisulfite, about 0.5 to about 10% by weight, preferably about 0.5 to about 9% by weight, and most preferably about 0.5 to about 8% by weight; and (f) potassium sorbate, about 1 to about 15% by weight, preferably about 2 to about 10% by weight, and most preferably about 4 to about 8% by weight.

The total amount of the blend of SAP and DAP included in the chemical mixture IIA is about 25 to about 68% by weight, preferably about 30 to about 65% by weight, and most preferably about 33 to about 64% by weight. Such a chemical mixture IIA also comprises:

(b) calcium chloride, about 5 to about 25% by weight, preferably about 8 to about 22% by weight, and most preferably about 10 to about 20% by weight;

(c) citric acid, about 5 to about 25% by weight, preferably about 7 to about 22% by weight, and most preferably about 8.5 to about 18% by weight;

(d) L-ascorbic acid, about 2 to about 20% by weight, preferably about 4 to about 18% by weight, and most preferably about 5 to about 16% by weight;

(e) sodium bisulfite, about 0.5 to about 10% by weight, preferably about 0.5 to about 9% by weight, and most preferably about 0.5 to about 8% by weight; and (f) potassium sorbate, about 1 to about 15% by weight, preferably about 2 to about 10% by weight, and most preferably about 4 to about 8% by weight.

In all embodiments of the invention, it is preferred to use potassium sorbate in powder form, rather than granules.

In all chemical mixtures of the invention, magnesium chloride may be used instead of calcium chloride; or a blend of magnesium chloride and calcium chloride can be used instead of calcium chloride. If magnesium chloride is used, it is included in the chemical mixtures in the same relative amounts as calcium chloride. Similarly, if a blend of magnesium chloride and calcium chloride is used, it is included in the chemical mixtures in the same relative amounts as calcium chloride. The blend comprises approximately equal weight amounts of the magnesium chloride and calcium chloride.

In all chemical mixtures of the invention, L-ascorbic acid may be omitted, but the resulting product may have a taste which is more tart than the product made with the L-ascorbic acid.

The chemical mixtures may be applied to the fresh vegetables in the process of the invention in any suitable manner. Preferably, as discussed above, they are applied as aqueous solutions in purified or distilled water. In one preferred embodiment, the concentrated aqueous solution of the chemical mixture II comprises about 2 to about 5% by weight of that mixture. It will be understood that whenever a reference is made herein to a diluted aqueous solution of the chemical mixture II, it may include either the chemical mixture II or the chemical mixture IIA. Similarly, a reference to a concentrated aqueous solution of the chemical mixture II includes either the chemical mixture II or the chemical mixture IIA. The vegetables are contacted with the aqueous solution of a chemical mixture for a time sufficient to produce a fresh vegetable product having a long shelf life in accordance with the present invention. Usually, after a substantial amount of vegetables is processed, the content of the chemical mixture in the aqueous solution in the solution tank is likely to decrease. To offset the decrease, a sufficient amount of a fresh aqueous solution should be added to bring the concentration of the chemical mixture in the solution tank to a desired range, such as that set forth above.

One of the unique features of the process of this invention when it is applied to vegetables susceptible to surface discoloration upon exposure to air, such as potatoes, is that it uses substantially smaller amounts of sodium bisulfite than what was thought to be necessary in prior art. As a result, no intentionally added sugars, such as dextrose, are necessary in the process to counteract the unpleasant taste imparted by relatively high amounts of sodium bisulfite to such vegetables in prior art. Nonetheless, it will be understood by those skilled in the art that if any sugars are inherently present in any of the ingredients of the solution used in the process or in the vegetables themselves, they will be present in the final fresh vegetable product suitable for consumption or further processing made by the process of this invention.

As a result, the fresh vegetable product of the invention made from a vegetable which is susceptible to surface discoloration upon exposure to air, such as a potato, has a substantially lower content of sodium bisulfate than similar vegetables of prior art. Thus, according to one embodiment of the invention, the vegetables, such as potatoes, are believed to include about 0.01 to about 2% by weight of sodium bisulfite. This compares favorably to about 10% by weight of sodium bisulfate in similar products of prior art.

In general, the fresh vegetable product made by the process of this invention, is maintained after it is packaged, at refrigerated conditions of about 33° to about 50° F., preferably about 35° to about 40° F., and has substantially the appearance and taste of vegetables which are purchased fresh at a grocery store and subsequently cleaned and, if needed, subdivided manually by a chef in a restaurant or a consumer in his or her own kitchen. The fresh vegetable product of this invention maintains such appearance and taste for a relatively long period of time, from about seventeen (17) to about twenty-seven (27) days from the time that it is packaged as described above in the processing plant. Thus, such a fresh vegetable product is suitable for immediate consumption by consumers or can be subjected to further processing, such as cooking, frying, grilling, steaming, or sauteing, in a manner similar to the vegetables bought at the grocery store and manually cleaned and, if needed, peeled and/or subdivided.

The fresh vegetable product of this invention made with chemical mixture I includes disodium acid pyrophosphate calcium chloride, citric acid and potassium sorbate. In this product, disodium acid pyrophosphate may be substituted by sodium acid pyrophosphate or by a blend of SAP and DAP. Similarly, calcium chloride may be substituted by magnesium chloride or by a mixture of calcium chloride and magnesium chloride. This product may also include L-ascorbic acid.

The fresh vegetable product of this invention made with the chemical mixture II includes sodium acid pyrophosphate, calcium chloride, citric acid, potassium sorbate, L-ascorbic acid and sodium bisulfite. Sodium acid pyrophosphate may be replaced by disodium acid pyrophosphate or a blend of SAP and DAP. Calcium chloride may be replaced by a magnesium chloride or a blend of calcium chloride and magnesium chloride. Sodium bisulfite may be replaced with additional sodium acid pyrophosphate and/or calcium chloride.

The fresh vegetable product of this invention made with the chemical mixture I from vegetables which are not susceptible to surface discoloration upon exposure to air (e.g., carrots, onions, green beans or peppers) includes disodium acid pyrophosphate and/or sodium acid pyrophosphate, calcium chloride (or magnesium chloride or a mixture of calcium chloride and magnesium chloride), citric acid and potassium sorbate. The amounts of these chemical ingredients included in the fresh vegetable product are as follows:

(a) disodium acid pyrophosphate and/or sodium acid pyrophosphate, about 0.01 to about 2.0 by weight, preferably about 0.02 to about 0.1% by weight, and most preferably about 0.05 to about 0.065% by weight;

(b) calcium chloride (or magnesium chloride, or a blend of magnesium chloride and calcium chloride), about 0.01 to about 2.0% by weight, preferably about 0.015 to about 0.1% and most preferably about 0.02 to about 0.04% by weight;

(c) citric acid, about 0.1 to about 2.0% by weight, preferably about 0.1 to about 0.9% by weight and most preferably about 0.15 to about 0.35% by weight;

(d) potassium sorbate, about 0.09 to about 2.0% by weight, preferably about 0.05 to about 0.20% by weight, and most preferably about 0.10 to about 0.25% by weight; and, optionally (e) L-ascorbic acid about 0.001 to about 1.0% by weight, preferably about 0.005 to about 0.015% by weight, and most preferably about 0.008 to about 0.012% by weight.

A fresh vegetable product made with the chemical mixture II from a vegetable susceptible to surface discoloration upon exposure to air includes:

(a) SAP, about 0.01 to about 2.0% by weight, preferably about 0.02 to about 0.1% by weight, and most preferably about 0.05% to about 0.065% by weight;

(b) calcium chloride, about 0.01 to about 2.0% by weight, preferably about 0.015 to about 0.1% by weight, and most preferably about 0.02 to about 0.04% by weight;

(c) citric acid, about 0.1 to about 2.0% by weight, preferably about 0.1 to about 0.90% by weight, and most preferably about 0.15 to about 0.35% by weight;

(d) L-ascorbic acid, about 0.001 to about 1.0% by weight, preferably about 0.005 to about 0.015% by weight, and most preferably about 0.008 to about 0.012% by weight;

(e) sodium bisulfite, about 0.01 to about 2.0% by weight, preferably about 0.02 to about 0.90% by weight, and most preferably about 0.035 to about 0.055% by weight; and (f) potassium sorbate, about 0.09 to about 2.0% by weight, preferably about 0.05 to about 0.20% by weight, and most preferably about 0.10 to about 0.25% by weight.

A fresh vegetable product of the invention made with the chemical mixture IIA from a vegetable susceptible to surface discoloration upon exposure to air includes:

(a) DAP, about 0.01 to about 2.0% by weight, preferably about 0.02 to about 0.1% by weight, and most preferably about 0.05% to about 0.065% by weight;

(b) calcium chloride, about 0.01 to about 2.0% by weight, preferably about 0.015 to about 0.1% by weight, and most preferably about 0.02 to about 0.04% by weight;

(c) citric acid, about 0.1 to about 2.0% by weight, preferably about 0.1 to about 0.90% by weight, and most preferably about 0.15 to about 0.35% by weight;

(d) L-ascorbic acid, about 0.001 to about 1.0% by weight, preferably about 0.005 to about 0.015% by weight, and most preferably about 0.008 to about 0.012% by weight;

(e) sodium bisulfite, about 0.01 to about 2.0% by weight, preferably about 0.02 to about 0.90% by weight, and most preferably about 0.035 to about 0.055% by weight; and (f) potassium sorbate, about 0.09 to about 2.0% by weight, preferably about 0.05 to about 0.20% by weight, and most preferably about 0.10 to about 0.25% by weight.

As stated above, in the fresh vegetable products made with the chemical mixture II or chemical mixture IIA from vegetables susceptible to discoloration upon exposure to air, calcium chloride may be substituted by magnesium chloride or a blend of calcium chloride and magnesium chloride. In such an event, the fresh vegetable product will have the same relative amounts of magnesium chloride or the blend as calcium chloride.

Similarly, a blend of SAP and DAP may be substituted for SAP in the chemical mixture II. In such an event, the relative amount of the blend included in the fresh vegetable product is the same as that of SAP (identified above). Relative amounts of all the other ingredients will be also the same as those set forth above for the fresh vegetable product made with the chemical mixture II.

In the chemical mixture IIA, a blend of DAP and SAP may also be substituted for DAP. A fresh vegetable product made with the chemical mixture IIA including such a blend includes the same relative amounts of the blend as the DAP (identified above). Relative amounts of all the other ingredients in the fresh vegetable product made with the chemical mixture IIA including such a blend will be the same relative amounts as set forth above for the fresh vegetable product made with the chemical mixture IIA. Such a product is substantially free of surface discoloration and substantially maintains its fresh appearance, taste and remains substantially free of surface discoloration for a period of up to twenty-seven (27) days.

It is also within the scope of the present invention to pre-cook or partially cook or brown the dried fresh vegetables before they are packaged. In this embodiment, the dried, fresh vegetables are pre-cooked for a given period of time or until the desired degree of doneness, then they are allowed to cool to a substantially ambient temperature and packaged in the same manner as the fresh vegetables. The resulting product is referred to herein as a "partially cooked vegetable product." Such a partially cooked vegetable product can be used by consumers for immediate consumption or, if desired, to further process it in the usual manner, such as cooking, frying, sauteing, or steaming it.

Figure 1B:
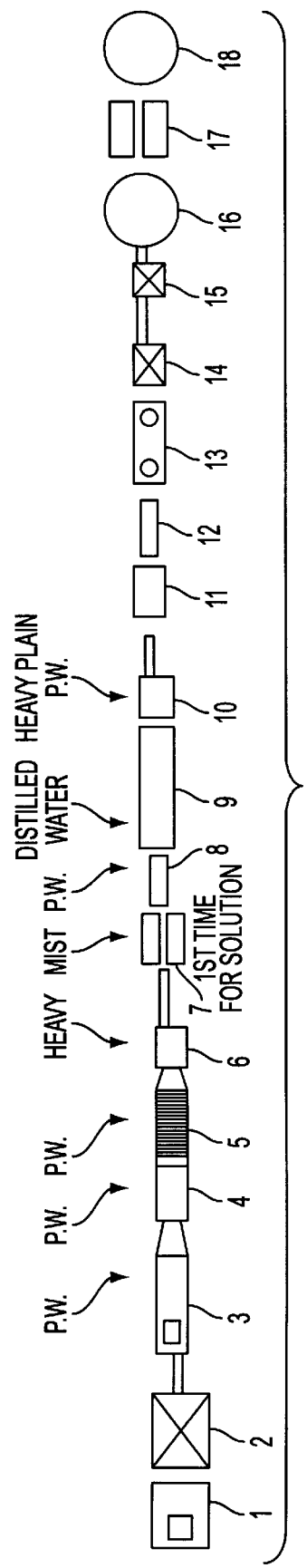

The process of the invention will now be generally described in conjunction with FIG. 1, which describes schematically the production of fresh, subdivided potato products. While in the process of FIG. 1, a fresh, subdivided potato product is made, it will be apparent to those skilled in the art that this process may also be used to make a fresh whole potato product (by omitting the slicer, dicer, or shredder, 7). Also, this process may be used to make a fresh subdivided or whole product from other vegetables, such as carrots or beans. Referring to FIG. 1, harvested potatoes, which were previously washed with water, are deposited into a tote dumper, 1, from which they can be removed by an elevator hopper, 2. Subsequently, they are transferred to a peeler, 3, where they are substantially immersed in purified water, or a relatively heavy stream of purified water is sprayed as a heavy mist onto the potatoes in the peeler, 3. The peeled potatoes are transferred to a barrel washer, 4, where they are also submerged in water and any remaining skin and blemishes and discoloration are removed by any suitable means, e.g., manually. The entire peeling operation is conducted also under water or with the potatoes covered (or bathed continuously) by a heavy purified water mist. Subsequently the potatoes are transferred to a roller inspection table, 5, wherein they are also either submerged under purified water or subjected to a heavy, purified water mist. From the roller inspection table, 5, they are transferred by an elevator conveyor, 6, to a subdividing apparatus, 7, wherein they are sliced, diced, or shredded. The subdividing operation takes place under an aqueous solution (i.e., submerged under) or under a heavy mist of an aqueous solution. The aqueous solution is either the aqueous solution of the chemical mixture I or the diluted aqueous solution of the chemical mixture II. A watering mesh conveyor, 8, removes the potatoes from the subdividing apparatus and transfers them to a cold water auger/chemical feeder, 9, wherein they are contacted with aqueous chemical solution of the chemical mixture I or the concentrated aqueous solution of the chemical mixture II. An elevator conveyor, 10, transfers the potatoes to a dewatering shaker, 11, and subsequently a conveyor, 12, transfers them to an ambient dryer belt, 13. The potatoes are also submerged in purified water or a heavy mist of purified water is sprayed onto them while they are on the elevator conveyor, 10. An elevator conveyor, 14, transfers the potatoes from the ambient dryer belt, 13, to a net weigher, 15, wherein they are inserted into a package and weighed. Subsequently, the potatoes are transferred to a round accumulator, 16, (similar to a "Lazy Susan" arrangement) wherein they are stored until they can be transferred to a packing step, 17. In the packing step, 17, each package is either vacuum packed or gassed and packed and sealed. Manual or automated vacuum packers, 25, package the potatoes under vacuum into plastic bags substantially impermeable to air or the potatoes are gas packed. Subsequently, the bags are transferred to a round accumulator, 18, wherein they are boxed and stored in a cooled area at a temperature of about 33° to about 50° F. Preferably, each box contains twelve (12) to eighteen (18) one pound packages.

All unit operations described herein are conducted with conventional equipment well known to those skilled in the art and available from various suppliers.

FIG. 2 illustrates a top view of a case (or unit) for displaying the fresh vegetable product of this invention. This case is designed to be attached to an existing refrigerated produce showcase. The case is made of three-sixteenth (3/16) inch thick plastic with dividing doors hinged to open three-quarter, so when opened they will close by themselves. The unit is 12 inches across, 8 inches high and 12 inches in length with the back open to allow air to move. A fan can be used depending on air movement of the existing refrigerated produce showcase. At the bottom, an adjustable bar from the front bottom and at the bottom will run to the existing showcase to support the unit. For additional support, the back of this unit (or case) is opened to allow cold air in from the existing refrigerated produce showcase to keep proper temperature. A lip 2 at the back and to the bottom of the unit is to secure to the existing showcase to enhance support of the unit. This lip is 1 (one) inch front to back and 3 (three) inches high. The locking loops are to further secure the unit to the showcase. This unit is designed to use existing refrigeration in the store and is mounted to the produce refrigeration section.

Figure 3:
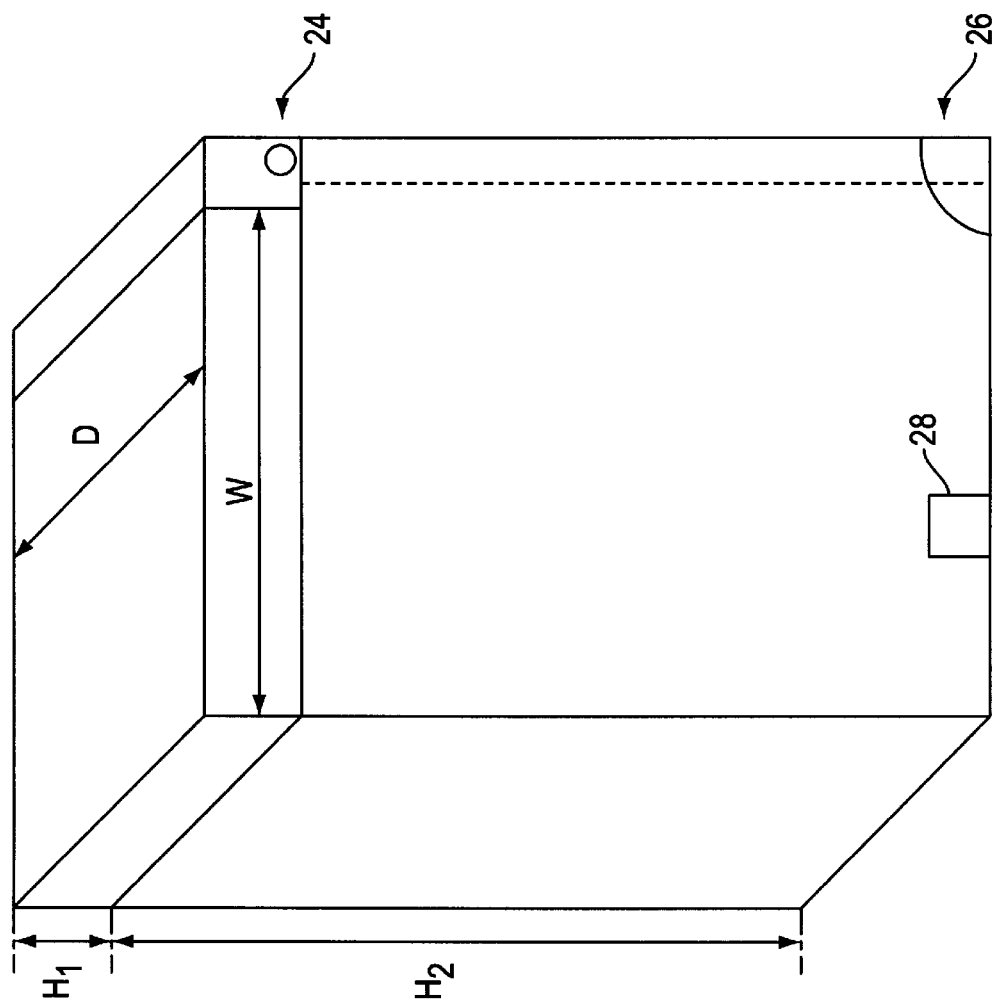
FIG. 3 is an illustration of another embodiment of a display case which may be used to display and market the fresh vegetable product of the invention.

FIG. 3 shows a top case made of three-sixteenth (3/16) inch thick plastic or plexiglass for displaying the fresh vegetable product of this invention. Twenty holes are made in the bottom of the case for air movement. Two french doors (on top, not illustrated) are hinged to open three-quarters of the way and the doors will close by themselves if necessary. A four inch fan is placed at the bottom of the unit to circulate air. When the doors are opened, a dead switch shuts off the fan. The top of the case is made of a clear, see-through material.

Further details of the process for making a fresh potato product and other vegetables, such as carrots, onions, green beans, pole beans and green or red peppers, are described in the following Examples. Specific examples of various embodiments will also be described.

It will be understood by those skilled in the art that the specific embodiments described below, including the Examples, are merely illustrative of the invention and are not intended to limit the scope of the invention. The scope of the invention is defined by the general description thereof and the remainder of the specification.

EXAMPLE 1

Cut Potatoes

Fresh cut potatoes are made by the following steps, in the recited sequence.
1. The potatoes to be peeled are first washed with regular water.
2. Next, they are transferred to a peeler, where purified water is used while peeling is being done. In the peeler, the potatoes are substantially completely covered by purified water, either by submerging them or by spraying a heavy purified water mist.
3. The peeled potatoes are transferred into a holding tank of purified water and are worked (eyed and the rest of peeling taken off or bad spots removed). This step is conducted with the potatoes under purified water to minimize or substantially prevent the exposure to air.
4. Next, the potatoes, substantially constantly sprayed with purified water or on an under water conveyer belt, are transferred to the cutters.
5. While the potatoes are cut, a diluted aqueous solution comprising 0.125% by weight of the chemical mixture in distilled water in mist form is sprayed over top of and running on the potatoes substantially constantly, to minimize as much as possible exposure of the potatoes to air.
6. The cut potatoes are transported by an under water conveyer belt submerged in distilled water, containing the diluted aqueous solution of the chemical mixture, to a solution tank.
7. The solution tank is filled with distilled water, which includes 5% by weight of the chemical mixture. This tank has a mesh under water conveyer belt, so substantially all potatoes are exposed to the ingredients of the solution. Potatoes are kept in this tank for 18 to 22 minutes, while being stirred or mixed. Alternatively, this tank may contain a cold water auger, which will move the potatoes through the tank and mix them thoroughly with the aqueous chemical solution.
8. After leaving the solution tank, the potatoes are placed on a mesh conveyer belt that uses a heavy washing sprinkling system of purified water, with no ingredients of the chemical mixture added, to rinse potatoes well before they are dried. Then, the potatoes are dried by any suitable means, such as by spin drying or drying machines, and placed on a mesh conveyer belt.
9. The packaging machines weigh and package the cut, dried potatoes using: (a) vacuum pack or (b) food grade nitrogen gas, and using vacuum barrier bags or bags that do not allow air in.
10. After packaging, the packaged potatoes are stored at about 35° to about 41° F. The packaged potatoes are transported to stores in refrigerated trucks at about 35° to about 50° F.
11. In the stores, the potatoes are held in a refrigerated display case.
12. The potatoes have a shelf life of about 17 up to about 27 days from the time of processing.

After 125 lbs. of potatoes, (are processed) some fresh make-up solution is added to the solution tank. The fresh make-up solution is made up by using about 35% (or more) of the ingredients of the chemical mixture, per 1 gallon of distilled water, used initially in step 7 to make the concentrated aqueous solution of the chemical mixture. For example, if 35% of the ingredients are used to make the fresh make-up solution, the content of the chemical mixture in 1 gallon of distilled water will be:

|   | Percent |   | Grams |   |
|---|---------|---|-------|---|
| (1) | 31.40 | Sodium Acid Pyrophosphate | 15 | |
| (2) | 19.68 | Calcium Chloride | 9.4 | |
| (3) | 18.32 | Citric Acid | 8.75 | |
| (4) | 15.07 | L-Ascorbic Acid | 7.2 | |
| (5) | 8.06 | Sodium Bisulfite | 3.85 | |
| (6) | 7.32 | Potassium Sorbate | 3.50 | |
|   |   | TOTAL | 47.7 | (3.1% per weight total solution) |

Then, 50 more lbs. of potatoes are processed before the solution is changed.

All under water systems must be deep enough to cover potatoes at all times. The potatoes to be used are preferably grade 1 (one) of Idaho or Russett.

The following chemical mixture was used to make a process solution (i.e., a concentrated aqueous solution) in 4 gallons of distilled water for step 7 of this Example:

|   | Percent (wt.) |   | Grams |   |
|---|---------------|---|-------|---|
| (1) | 31.433 | Sodium Acid Pyrophosphate | 171 | |
| (2) | 19.669 | Calcium Chloride | 107 | |
| (3) | 18.382 | Citric Acid | 100 | |
| (4) | 15.073 | L-Ascorbic Acid | 82 | |
| (5) | 8.088 | Sodium Bisulfite | 44 | |
| (6) | 7.352 | Potassium Sorbate | 40 | |
|   |   | TOTAL | 544 | (3.46% per weight total solution) |

The potatoes may also be partially cooked or browned before they are packaged. For example, regular-diced-french fries are cooked in vegetable oil for 4 minutes and 30 seconds or until brown, then allowed to cool, and packaged. For hash browns, the potatoes are cooked 3 minutes and 40 seconds or until brown, then allowed to cool and packaged. Cooking temperature for both french fries and hash browns is 400° F.

EXAMPLE 2

Cut Carrots and Onions

Fresh cut carrots and onions are prepared in a multi-step process of this Example.
1. Raw carrots or onions are washed in purified water.
2. The carrots are transferred by using a mesh conveyer belt and a spray of distilled water in heavy mist form to a cutter. The carrots are cut in the cutter, while an aqueous solution of the chemical mixture defined below was applied for 10 minutes. The onions are diced instead of cut, but using mesh conveyer belt, they will be continuously sprayed by a heavy flow of the aqueous solution of the chemical mixture defined below for 10 minutes.
3. The carrots or onions are then dried by fans while they are transported on a mesh conveyer belt. The fans are placed under and over the mesh conveyer belt.
4. The dried carrots or onions are packaged using vacuum barrier bags or bags that do not allow air in and (a) vacuum or (b) nitrogen industrial food grade gas. The term "industrial food grade gas" means that the gas has purity of at least 99.90 to 99.99%.%
5. The packaged fresh cut onions or carrots should be stored at refrigeration temperature as of about 35° to about 41° F. and transported in refrigerated trucks.

6. Once delivered to a store, the packaged fresh cut vegetable products (i.e., fresh cut onions or carrots) should also be displayed under refrigeration temperature of about 35° to about 41° F. with a date (i.e., the "sell by" date) on the package of about 17 to about 27 days from processing.

After 100 lbs. of cut carrots or onions are processed, some fresh make-up solution is added to the solution tank. The fresh make-up solution is made up by using 35% (or more) of the ingredients of the chemical mixture defined below per 1 gallon of distilled water. Then, 30 more pounds of the cut carrots or onions are processed before the solution is changed.

|  | Percent (by wt.) |  | Grams |  |
|---|---|---|---|---|
| (1) | 45.454 | Sodium Acid Pyrophosphate | 50 |  |
| (2) | 30.409 | Calcium Chloride | 34 |  |
| (3) | 10.00 | Citric Acid | 11 |  |
| (4) | 9.090 | Potassium Sorbate | 10 |  |
| (5) | 4.545 | Food Coloring | 5 |  |
|  |  | TOTAL | 110 | (0.72% per weight total solution) |

An aqueous solution for carrots is made from 4 gallons of distilled water and the following chemical mixture:

|  | Percent (by wt.) |  | Grams |  |
|---|---|---|---|---|
| (1) | 48.076 | Sodium Acid Pyrophosphate | 50 |  |
| (2) | 32.682 | Calcium Chloride | 34 |  |
| (3) | 14.423 | Citric Acid | 15 |  |
| (4) | 4.807 | Potassium Sorbate | 5 |  |
|  |  | TOTAL | 104 | (0.68% per weight total solution) |

EXAMPLE 3

Stringed-Cut Green Beans or Pole Beans/Green or Red Peppers

The steps for processing cut green beans, pole beans, green or red peppers are summarized below.
1. The vegetables are washed in purified water.
2. Using a mesh conveyer belt and using an aqueous solution defined below, in distilled water, in mist form sprayed over the belt, the green beans are stringed and the inside of the peppers is taken out while these vegetables are transported by the conveyer belt. The green beans are stringed by machine and/or manual labor and the peppers are cut by machine and/or manual labor.
3. Using a mesh conveyer belt and using an aqueous solution, defined below, in distilled water in heavy mist form, the pole/green beans and peppers are cut while on the conveyor belt. The vegetables, once cut, must be substantially constantly covered by this mist. The aqueous solution includes 5% weight of the chemical mixture defined below. Approximate time from the beginning of step 2 to the end of step 3 is about 10 minutes.
4. A mesh conveyer belt is used to transport the vegetables, covered on the conveyer belt in step 3 with heavy mist spray of the aqueous solution, to a shaking belt. A heavy mist of purified water is applied to the vegetables on the shaking belt. The water does not have any ingredients of the chemical mixture.
5. The vegetables are then transferred to a different mesh conveyer, wherein they are dried with fans placed over and under the conveyer belt.
6. The vegetables are then packaged using vacuum barrier bags or bags that do not allow air in the product to be packed using (A) vacuum, (B) or industrial food grade nitrogen gas.
7. The fresh, cut green beans, pole beans or peppers are stored in a refrigerated space at about 35° to about 41° F., and transferred to stores in refrigerated trucks.
8. In the stores, the cut, fresh vegetable products are displayed under refrigeration temperature of about 35° to about 41° F. with a "to be sold by" date of 17 to 27 days from processing. The fresh, cut vegetable products are maintained under refrigeration temperature at substantially all times.

After 100 lbs. of any one of the vegetables of this Example are processed, some make-up solution is added to the solution tank. The fresh make-up solution is made by using about 25% (or more) of the ingredients of the chemical mixture defined below per 1 gallon of distilled water. Then 30 more lbs of the vegetables are processed. All vegetables are Grade 1 quality.

Four gallons of distilled water and the following chemical mixture may be used:

|  | Percent (wt.) |  | Grams |  |
|---|---|---|---|---|
| (1) | 31.547 | Sodium Acid Pyrophosphate | 53 |  |
| (2) | 20.833 | Citric Acid | 35 |  |
| (3) | 20.238 | Calcium Chloride | 34 |  |
| (4) | 16.071 | L-Ascorbic Acid | 27 |  |
| (5) | 05.452 | Food Coloring | 10 |  |
| (6) | 0.357 | Potassium Sorbate | 9 |  |
|  |  | TOTAL | 159 | (1.04% per weight total solution) |

EXAMPLE 4

Whole or Cut Potatoes

Fresh whole or cut potatoes are made in the process of this Example.
1. The whole potatoes to be peeled or partially peeled are washed first with regular water or purified water or distilled water, having temperature of about 35 to about 55° F.
2. The whole potatoes are peeled or partially peeled in this step. Purified water or distilled water at about 35° to about 50° F. is to be used in this peeling or partial peeling step. While peeling or partial peeling is being done, water temperature is about 35° to about 50° F.
3. The peeled potatoes or partially peeled potatoes go into a holding tank of purified water or distilled water or into a heavy mist of purified water or distilled water and are worked (eyed and the rest of the peel taken off for peeled potatoes and bad spots or discolored spots removed). This is to be done under water or in heavy mist to substantially prevent the exposure of potatoes to air or at least minimize the exposure to air. The building or space or processing area is maintained at 50° F. or below but always above the freezing temperature of 32° F. Water temperature in this step is about 35° about 50° F.
4. The potatoes are taken by a mesh conveyor belt to a cutting area. The mesh conveyer belt is submerged in purified or distilled water, or a heavy mist of purified or distilled water is sprayed on the conveyer belt to prevent or eliminate contact with air. In the cutting area some potatoes are cut and the remaining potatoes are left whole bypassing step 5 and continuing to the next area, in step 6.

5. A diluted aqueous solution of a suitable chemical mixture in purified water or distilled water in mist form runs over the cutting machines and onto the potatoes at all times, while being cut with the least exposure to air possible. The diluted aqueous solution contains 0.125% of the chemical mixture. The water temperature is about 35° to about 50° F.

6. An under water conveyer belt, submerged in the diluted aqueous solution of the chemical mixture in purified or distilled water or an above-water conveyer belt having a heavy diluted aqueous solution mist applied to it takes the cut potatoes or whole potatoes to the solution tank. The temperature of the diluted aqueous solution on the conveyor belt and the diluted aqueous solution mist is about 35° to about 50° F.

7. The solution tank is filled with a concentrated aqueous solution of the chemical mixture in purified water or distilled water, or a very heavy mist, the concentrated aqueous solution in purified or distilled water is applied to a mesh conveyer belt. All process solution ingredients (of a suitable chemical mixture) are in this tank or in the very heavy mist, so that all potatoes, cut or whole, are exposed to the ingredients for 18 to 22 minutes while being stirred or mixed or moved. The concentrated aqueous solution contains 5% by weight of the chemical mixture. The water temperature of the spray or in the solution tank is about 35° to about 50° F.

8. After coming out of the solution tank or leaving the conveyer belt having the very heavy mist applied to it, the potatoes are placed on a mesh conveyer belt that has a heavy washing spraying system of purified water or distilled water, with no process solution ingredients added to the water, to rinse potatoes well before being dried. The water temperature is about 35° to about 50° F. Then the potatoes are dried by spin drying by a drying machine or an ambient-temperature dryer belt. The ambient temperature dryer belt comprises a mesh conveyer belt and no mist water is applied to the cut potatoes on the belt. The potatoes are dried by industrial fans placed on and above and under belt.

9. In this step, the conventional packaging machines weigh and package the fresh, cut potatoes using vacuum pack in barrier bags or plastic air tight containers, or using industrial food grade nitrogen or industrial food grade argon or packaged using industrial food grade helium. One of the objects of this packaging step is to remove substantially all or as much of the air out of the container or package as possible to vacuum seal the package and keep air out as long as possible.

10. The packaged fresh, cut or whole potatoes are stored at about 33° to about 41° F.

11. At the point of sale, the packaged, fresh, cut or whole potatoes are held in a refrigerated showcase which may form a part of this invention. The refrigerated showcase may have two different designs. The first design may include a conventional showcase or cool display case having a see-through top. Another design includes a smaller case that attaches to a refrigeration system of a store and also has a see-through top. The small case is 12 by 12 inches in length and width, and 8 inches high. This case is preferably made of plastic and designed to attach to a conventional store produce section already in place and has refrigerated air supplied to it. This is called an "added convenience case". The larger case is 25 inches by 22 inches length by width, and is 34.8 inches high with plastic or plexiglass showcase on top. The showcase of plastic is 8 inches high. Also, a conventional showcase may be used.

12. The potatoes have a date on the package of up to 27 days from the time of processing.

After 100 to 150 lbs. of the potatoes of this Example are processed, some make-up solution is added to the solution tank. The fresh make-up solution is made by using about 20 to 25% (or more) of the ingredients of the chemical mixture defined below per 1 gallon of distilled water. Then 30 to 60 more lbs of the vegetables are processed. All vegetables are Grade 1 quality.

All under water systems must be deep enough to substantially completely cover the potatoes and all mist spray is heavy enough to expose entire potatoes, cut or whole, to the water. All potatoes to be used are Grade 1 (one) potatoes.

The fresh, cut or whole potatoes may also be pre-cooked or partially cooked or browned, before packaging. To produce regular-diced-french fries—the fresh, cut potatoes are cooked in vegetable oil or a mixture of tallow oil for 4 minutes and 30 seconds or until brown. The potatoes are allowed to cool; then packaged, as described above.

To produce hash browns, the potatoes are cut into a regular cut of hash brown, then cooked or fried—cooked 3 minutes and 40 seconds—fried 4 minutes and 20 seconds, or until brown. To form hash browns, first a regular hash brown cut is used, then potatoes are chopped up and fit into a mold using 1½ ounce mold—they are cooked in the mold for 4 minutes and 50 seconds or until brown and packaged as discussed above.

The following chemical mixtures set forth below, were used to produce process solutions to make fresh, cut or whole potatoes in the process of this Example. Each process solution was made in 4 gallons of distilled or purified water.

| | Percent (wt.) | Example 4(a) | Grams | |
|---|---|---|---|---|
| (1) | 31.433 | Sodium Acid Pyrophosphate | 171 | |
| (2) | 19.669 | Calcium Chloride | 107 | |
| (3) | 18.382 | Citric Acid | 100 | |
| (4) | 15.073 | L-Ascorbic Acid | 82 | |
| (5) | 8.088 | Sodium Bisulfite | 44 | |
| (6) | 7.352 | Potassium Sorbate | 40 | |
| | | TOTAL | 544 | (3.46% per weight of solution) |

| | Percent (wt.) | Example 4(b) | Grams | |
|---|---|---|---|---|
| (1) | 31.433 | Disodium Acid Pyrophosphate | 171 | |
| (2) | 19.669 | Calcium Chloride | 107 | |
| (3) | 18.382 | Citric Acid | 100 | |
| (4) | 15.073 | L-Ascorbic Acid | 82 | |
| (5) | 8.088 | Sodium Bisulfite | 44 | |
| (6) | 7.352 | Potassium Sorbate | 40 | |
| | | TOTAL | 544 | (3.46% per weight of solution) |

-continued

| Percent (wt.) | Example 4(a) | | Grams |
|---|---|---|---|

| Percent (wt.) | Example 4(c) | | Grams |
|---|---|---|---|
| (1) | 33.088 | Sodium Acid Pyrophosphate | 180 |
| (2) | 18.014 | Calcium Chloride | 98 |
| (3) | 17.830 | Citric Acid | 97 |
| (4) | 15.625 | L-Ascorbic Acid | 85 |
| (5) | 11.213 | Potassium Sorbate | 61 |
| (6) | 4.227 | Sodium Bisulfite | 23 |
| | | TOTAL | 544 (3.46% per weight of solution) |

| Percent (wt.) | Example 4(d) | | Grams |
|---|---|---|---|
| (1) | 56.504 | Sodium Acid Pyrophosphate | 278 |
| (2) | 13.821 | Calcium Chloride | 68 |
| (3) | 11.788 | L-Ascorbic Acid | 58 |
| (4) | 10.162 | Citric Acid | 50 |
| (5) | 4.065 | Sodium Bisulfite | 20 |
| (6) | 3.658 | Potassium Sorbate | 18 |
| | | TOTAL | 492 (3.14% per weight of solution) |

| Percent (wt.) | Example 4(e) | | Grams |
|---|---|---|---|
| (1) | 54.054 | Sodium Acid Pyrophosphate | 200 |
| (2) | 18.918 | Calcium Chloride | 70 |
| (3) | 17.567 | Citric Acid | 65 |
| (4) | 4.864 | Sodium Bisulfite | 18 |
| (5) | 4.594 | Potassium Sorbate | 17 |
| | | TOTAL | 370 (2.38% per weight of solution) |

| Percent (wt.) | Example 4(f) | | Grams |
|---|---|---|---|
| (1) | 54.054 | Disodium Acid Pyrophosphate | 200 |
| (2) | 18.918 | Calcium Chloride | 70 |
| (3) | 17.567 | Citric Acid | 65 |
| (4) | 4.864 | Sodium Bisulfite | 18 |
| (5) | 4.594 | Potassium Sorbate | 17 |
| | | TOTAL | 370 (2.38% per weight of solution) |

| Percent (wt.) | Example 4(g) | | Grams |
|---|---|---|---|
| (1) | 63.911 | Sodium Acid Pyrophosphate | 317 |
| (2) | 9.879 | Calcium Chloride | 49 |
| (3) | 9.274 | L-Ascorbic Acid | 46 |
| (4) | 8.467 | Citric Acid | 42 |
| (5) | 4.435 | Potassium Sorbate | 22 |
| (6) | 4.032 | Sodium Bisulfite | 20 |
| | | TOTAL | 496 (2.01% per weight of solution) |

EXAMPLE 4-1

Residue of Chemical Left on Potato Product

The following experiment was conducted to determine the amount of residue of chemical mixture II left on the potato product after treatment in accordance with the present invention. Potatoes were cut and treated in accordance with Example 4 using solution 4(a). The solution was applied to a total of one (1) lb. of potatoes, wherein one (1) lb. of potatoes was treated and tested. The one (1) lb. lot was tested for the weight percent of (1) sodium acid pyrophosphate, (2) calcium chloride, (3) citric acid, (4) L-ascorbic acid, (5) sodium bisulfite and (a) potassium sorbate as compared to the total weight of the potato product.

Table 1 summarizes the results:

| PARAMETER | RESULT | UNIT | METHOD* |
|---|---|---|---|
| Sodium Acid Pyrophosphate | 0.059 | % | AOAC |
| Calcium Chloride | 0.029 | % | AOAC |
| Citric Acid | 0.25 | % | AOAC |
| L-Ascorbic Acid | 0.01 | % | AOAC |
| Sodium Bisulfite | 0.044 | % | FDA |
| Potassium Sorbate | 0.177 | % | AOAC |

*The method conducted was based on methods disclosed by the American Organization Analytical Chemistry (AOAC) or by the Food and Drug Administration (FDA).

EXAMPLE 5

Whole or Cut, Scrubbed Carrots

Whole carrots are processed in a series of steps, summarized below.

(1) Whole carrots are washed in purified water or distilled water at a water temperature of 35° to 50° F.

(2) The whole carrots are scrubbed or cut by transporting them on a mesh conveyor belt, while a heavy mist of an aqueous solution in purified water or distilled water containing the chemical mixture defined below is applied to the carrots. The aqueous solution contains 6.8% by weight of the chemical mixture. The carrots are exposed to this mist for 9–12 minutes. On the conveyor belt, the carrots are scrubbed by scrubbed machines or cut by conventional cutting machines.

(3) The cut or scrubbed carrots are transferred to another mesh conveyor belt where they are dried by a drying ambient machine, e.g., industrial fans.

(4) The dried, cut or scrubbed carrots are packaged using vacuum barrier bags or plastic containers with air tight lids. The carrots are vacuum packed or packed using industrial food grade nitrogen, argon, or helium gas. These gases are used to get out as much air as possible and keep the air out of the bags or the containers to the extent possible.

(5) The packaged carrots are stored refrigerated at 33° to 44° F. and are transported in refrigerated trucks.

(6) The packaged carrots are displayed in stores at a refrigerator temperature of 33° to 44° F. with a date on the package of 27 days from processing.

After 100 to 130 pounds of carrots is processed, a 15% of more of total solution using the formula for 1 gallon is added to process 30 more pounds of carrots. All carrots are to be grade 1 (one) quality.

After step 2, but before step 3, carrots are rinsed in heavy purified water or distilled water, i.e., no chemicals of the chemical mixture are added to the water.

| | | CHEMICAL MIXTURE (Cut Carrots) | |
|---|---|---|---|
| | Percent (% wt.) | | Grams |
| (1) | 48.076 | Sodium Acid Pyrophosphate | 50 |
| (2) | 32.692 | Calcium Chloride | 34 |

-continued

CHEMICAL MIXTURE
(Cut Carrots)

| | Percent (% wt.) | | Grams | |
|---|---|---|---|---|
| (3) | 14.423 | Citric Acid | 15 | |
| (4) | 4.807 | Potassium Sorbate | 5 | |
| | | TOTAL | 104 | (0.68% per weight of solution) |

CHEMICAL MIXTURE
(Scrubbed Carrots)

| | Percent (% wt.) | | Grams | |
|---|---|---|---|---|
| (1) | 52.884 | Sodium Acid Pyrophosphate | 55 | |
| (2) | 27.884 | Calcium Chloride | 29 | |
| (3) | 14.423 | Citric Acid | 15 | |
| (4) | 4.807 | Potassium Sorbate | 5 | |
| | | TOTAL | 104 | (0.68% per weight of solution) |

EXAMPLE 6

Cut or Diced Onions

Cut or diced onions are made by the following steps.
(1) Whole, fresh onions are washed in purified water or distilled water having water temperature of 35° to 50° F.
(2) A mesh conveyor belt is used to transfer the onions to a cutting or dicing apparatus. The onions on the belt are sprayed with a light mist of purified water or distilled water at water temperature of 35° to 50° F. and they are cut by conventional cutting machines. The onions to be diced are diced by conventional dicing machines. All ingredients of the chemical mixture (defined below) are included in the light mist of the purified or distilled water to form an aqueous solution, which contains about 0.7% by weight of the chemical mixture. The light mist of the aqueous solution is applied to the cut or diced onions for 4 to 10 minutes during and after they are cut or diced, then, a light spray of purified or distilled water, without any ingredients of the chemical mixture, is applied to the cut or diced onions for 1 to 2 minutes to wash the onions.
(3) The cut or diced, washed onions are packaged in vacuum barrier bags or plastic containers with air tight lids. The onions are vacuum packed or packed using industrial food grade nitrogen, argon, or helium gas to minimize or substantially eliminate the contact of the onions with air.
(4) The packaged onions are stored at 33° to 44° F. and transported in refrigerated trucks at a similar temperature range.
(5) The packaged onions are displayed in a store under refrigeration temperature of 33° to 44° F. with a date on the package or container of 27 days from processing.
After 80 to 100 pounds of the onions is processed, some make-up solution is added to the light mist step 2. The fresh make-up solution is made by using 10% of the ingredients of the chemical mixture described below per 1 (one) gallon of purified or distilled water. Then, 30 more pounds of onions will be processed. All onions should be grade 1 (one) quality.
Note: once the onions are cut or diced, they will be exposed to the solution of the chemical mixture for 4 minutes. The chemical mixture, identified below, used for cut or diced onions was dissolved in 4 gallons of purified or distilled water to make the aqueous solution.

CHEMICAL MIXTURE
(Cut Onions)

| | Percent (% wt.) | | Grams | |
|---|---|---|---|---|
| (1) | 45.454 | Sodium Acid Pyrophosphate | 50 | |
| (2) | 30.909 | Calcium Chloride | 34 | |
| (3) | 10.00 | Citric Acid | 11 | |
| (4) | 9.090 | Potassium Sorbate | 10 | |
| (5) | 4.545 | Food Coloring | 5 | |
| | | TOTAL | 104 | (0.72% per weight of solution) |

CHEMICAL MIXTURE
(Diced Onions)

| | Percent (% wt.) | | Grams | |
|---|---|---|---|---|
| (1) | 48.245 | Sodium Acid Pyrophosphate | 55 | |
| (2) | 30.701 | Calcium Chloride | 35 | |
| (3) | 8.771 | Citric Acid | 10 | |
| (4) | 7.894 | L-Ascorbic Acid | 9 | |
| (5) | 4.385 | Food Coloring | 5 | |
| | | TOTAL | 114 | (0.74% per weight of solution) |

EXAMPLE 7

Cut Green or Red Peppers; Cut Celery

The above vegetables are prepared in the following steps.
(1) The green or red peppers or celery are washed in purified water or distilled water, at water temperature of 35° to 50° F.
(2) A mesh conveyor belt is used to transfer the peppers or celery to a cutting apparatus. A mist of purified or distilled water is applied to the peppers or celery while they are on the mesh conveyor belt. Once at the cutting apparatus, while the peppers are cut or the celery is cut and strung by machine or labor, water mist comprising the aqueous solution of the chemical mixture (defined below) is continuously applied to the vegetables. The water temperature in this step is 35° to 50° F.
(3) Ingredients of the chemical mixture (defined below) are added to purified or distilled water and the light mist spray of the resulting aqueous solution (or process solution) is continuously applied to the vegetables for 5 minutes. The aqueous solution comprises 1.1% by weight of the chemical mixture. The solution temperature in this step is 35° to 50° F.
(4) The vegetables are then washed with a heavy mist spray of purified water or distilled water and with no ingredients of the chemical mixture added. The vegetables are fan-dried or dried in ambient air.
(5) The vegetables are packed using vacuum barrier bags or plastic containers with air tight lids. The product is vacuum packed or packed using industrial food grade nitrogen gas, industrial food grade argon gas, or industrial food grade helium gas to minimize or substantially eliminate the contact of the peppers or celery with air.
(6) The packaged vegetables are stored at 33° to 44° F. and transported in refrigerated trucks. They are marketed with a date on the package of 27 days from the time of processing.

Note: After the peppers are cut, in step 2, the inside of the peppers should be cleaned out in step 2, by any conventional means, such as by a suitable machine or manually.

The chemical mixture, identified below, was dissolved in four gallons of distilled or purified water to make a process solution.

|     | Percent (% wt) |                       | Grams |                           |
|-----|----------------|-----------------------|-------|---------------------------|
| (1) | 31.547         | Sodium Acid Pyrophosphate | 53    |                           |
| (2) | 20.833         | Citric Acid           | 35    |                           |
| (3) | 20.238         | Calcium Chloride      | 34    |                           |
| (4) | 16.071         | L-Ascorbic Acid       | 27    |                           |
| (5) | 5.952          | Food Coloring         | 10    |                           |
| (6) | 5.357          | Potassium Sorbate     | 9     |                           |
|     |                | TOTAL                 | 168   | (1.1% per weight of solution) |

EXAMPLE 8

Whole or Stringed or Stringed and Cut Green Pole Beans

The beans are prepared in the following multi-step process.
(1) The beans are washed in purified water or distilled water at water temperature of 35° to 50° F.
(2) The green or pole beans are transported by a mesh conveyor belt to a stringing machine apparatus, where they are stringed. A mist of an aqueous solution including purified water or distilled water and ingredients of the chemical mixture are applied to the beans at temperature of 35° to 50° F. while the beans are on the conveyor belt and are being stringed. The aqueous solution comprises 1.1% by weight of the chemical mixture defined below. The residence time of the beans on the conveyor belt is 4 to 6 minutes.
(3) Then, the green or pole beans are transferred by a conveyer belt to cutting apparatus, where they are cut, while a light mist of purified or distilled water including the chemical mixture is applied to them. The water temperature is 35° to 50° F. Once stringed or cut, the contact of vegetables with air is to be minimized to the greatest extent possible by substantially constantly applying a mist of purified or distilled water.
(4) In the next step, an aqueous mist, of aqueous solution, including all ingredients of the chemical mixture is applied to the beans. The temperature of the mist is 35° to 50√ F.; the beans are subjected to this mist for 4 minutes.
(5) The beans are then washed (or rinsed) with purified water or distilled water containing no ingredients of the chemical mixture. A heavy spray of water is applied to the beans, which are then dried by a fan.
(6) The beans are packaged using vacuum barrier bags or plastic containers with air tight lids. The bean product is vacuum packed or packed using industrial food grade nitrogen gas or industrial food grade argon gas or industrial food grade helium gas to minimize or substantially eliminate the contact of the beans with air.
(7) The packaged beans are stored at 33° to 44° F. and transported in refrigerated trucks. The packaged beans are displayed in stores under refrigeration conditions at 33° to 44° F. with a date on the package of 27 days.

After 100 lbs. of any one of the vegetables of this Example are processed, some make-up solution is added to the solution tank. The fresh make-up solution is made by using about 25% (or more) of the ingredients of the chemical mixture defined below per 1 gallon of distilled water. Then 30 more lbs of the vegetables are processed. All vegetables are Grade 1 quality.

CHEMICAL MIXTURE
(Made Into a Process Solution in 4 Gallons of Purified or Distilled Water)

|     | Percent (% wt.) |                           | Grams |                                 |
|-----|-----------------|---------------------------|-------|---------------------------------|
| (1) | 31.547          | Sodium Acid Pyrophosphate | 53    |                                 |
| (2) | 29.833          | Citric Acid               | 35    |                                 |
| (3) | 20.238          | Calcium Chloride          | 34    |                                 |
| (4) | 16.071          | L-Ascorbic Acid           | 27    |                                 |
| (5) | 5.952           | Food Coloring             | 10    |                                 |
| (6) | 5.357           | Potassium Sorbate         | 9     |                                 |
|     |                 | TOTAL                     | 168   | (1.1% per weigh total solution) |

Modifications of the embodiments described above are possible. For example, conventional food additives may be added to the fresh vegetables while they are being processed in the process of the invention. Such conventional food additives include food coloring, seasonings, flavorings and flavors.

As stated briefly above, the invention provides significant advantages. The fresh vegetable product of the invention is convenient to use insofar as it eliminates substantial time usually necessary to clean, peel and wash fresh-bought vegetables. The fresh vegetable product can be stored in a household refrigerator to provide readily available fresh tasting vegetables which can be used, without any other preparatory work, for cooking. The fresh vegetable product, stored in a refrigerator also provides a readily available source of healthy and nutritious snacks, such as carrot or celery sticks. Other advantages include less time required by the consumer for food preparation.

This invention may be embodied in other forms or carried out in other ways without departing from the spirit or essential characteristics thereof. The described embodiments are therefore to be considered as in all respects illustrative and not restrictive, the scope of the invention being indicated by the appended claims, and all changes which come within meaning and range of equivalency are intended to be embraced by the claims.

I claim:

1. A process of manufacturing a fresh vegetable product for consumption or further processing, comprising the steps of:
   a. cleaning fresh vegetables;
   b. contacting the fresh, cleaned vegetables with an aqueous chemical mixture comprising disodium acid pyrophosphate and/or sodium acid pyrophosphate, calcium chloride, and/or magnesium chloride, citric acid and potassium sorbate;
   c. washing the fresh vegetables;
   d. at least partially drying the fresh vegetables; and
   e. packaging the fresh vegetables to obtain the fresh vegetable product for consumption or further processing.

2. The process according to claim 1, wherein the step e. comprises packaging the fresh vegetables under an atmosphere selected from the group consisting of vacuum, nitrogen gas, helium gas and argon gas.

3. The process according to claim 1, wherein the chemical mixture in step b. comprises about 25 to about 55% by weight of sodium acid pyrophosphate, about 15 to about 35% by weight of calcium chloride, about 5 to about 25% by weight of citric acid, and about 2 to about 15% by weight of potassium sorbate.

4. The process according to claim 1, wherein the chemical mixture in step b. further comprises about 10 to about 20% by weight of L-ascorbic acid.

5. The process according to claim 1, wherein the vegetables are selected from the group consisting of carrots, onions, green beans, peppers and celery.

6. A process of manufacturing a fresh potato product for consumption or further processing, comprising the steps of:
 a. cleaning fresh potatoes;
 b. optionally peeling the fresh, cleaned potatoes while they are substantially completely covered by water;
 c. passing the fresh potatoes to a vessel for additional optional peeling and cleaning, while they are substantially completely covered by water;
 d. contacting the fresh potatoes with a concentrated aqueous solution comprising a chemical mixture comprising sodium acid pyrophosphate, and/or disodium acid pyrophosphate, calcium chloride and/or a calcium chloride/magnesium chloride mixture, citric acid, L-ascorbic acid, sodium bisulfite and potassium sorbate;
 e. washing the fresh potatoes;
 f. at least partially drying the fresh potatoes; and
 g. packaging the fresh potatoes to obtain the fresh potato product for consumption or further processing.

7. The process according to claim 6, wherein the step g. comprises packaging the fresh potatoes under an atmosphere selected from the group consisting of vacuum, nitrogen gas, helium gas and argon gas.

8. The process according to claim 6, wherein the chemical mixture in step d. comprises about 25 to about 68% by weight of sodium acid pyrophosphate, about 5 to about 25% by weight of calcium chloride, about 5 to about 25% by weight of citric acid, about 2 to about 20% by weight of L-ascorbic acid, about 0.5 to about 10% by weight of sodium bisulfite and about 2 to about 15% by weight of potassium sorbate.

9. The process according to claim 6, further comprising a step b1., between the steps b and c., comprising subdividing the fresh potatoes while they are substantially completely covered by a diluted aqueous solution of a chemical mixture comprising about 0.08 to about 0.3% by weight of a chemical mixture including sodium acid pyrophosphate, calcium chloride, citric acid, L-ascorbic acid, sodium bisulfite and potassium sorbate.

10. The process according to claim 9, wherein the chemical mixture in step b1. comprises:
 about 25 to about 68% by weight of sodium acid pyrophosphate;
 about 5 to about 25% by weight of calcium chloride;
 about 5 to about 25% by weight of citric acid;
 about 2 to about 20% by weight of L-ascorbic acid;
 about 0.5 to about 10% by weight of sodium bisulfite;
 about 2 to about 15% by weight of potassium sorbate.

11. The process according to claim 6, wherein the chemical mixture comprises:
 about 25 to about 68% by weight of disodium acid pyrophosphate;
 about 5 to about 25% by weight of calcium chloride;
 about 5 to about 25% by weight of citric acid;
 about 2 to about 20% by weight of L-ascorbic acid;
 about 0.5 to about 10% by weight of sodium bisulfite; and
 about 1 to about 15% by weight of potassium sorbate.

12. The process according to claim 6, which is conducted at a temperature of about 33° to about 55° F.

13. A fresh vegetable product for consumption or further processing made by a process comprising the steps of:
 a. cleaning fresh vegetables;
 b. contacting the fresh vegetables with a chemical mixture comprising:
  i. disodium acid pyrophosphate and/or sodium acid pyrophosphate;
  ii. calcium chloride and/or magnesium chloride;
  iii. citric acid; and
  iv. potassium sorbate;
 c. washing the fresh vegetables;
 d. at least partially drying the fresh vegetables; and
 e. packaging the fresh vegetables to obtain the fresh vegetable product.

14. The fresh vegetable product according to claim 13, wherein the chemical mixture used in step b. comprises about 25 to about 55% by weight of sodium acid pyrophosphate, about 15 to about 35% by weight of calcium chloride, about 5 to about 25% by weight of citric acid, and about 2 to about 15% by weight of potassium sorbate.

15. The fresh vegetable product according to claim 13, wherein the chemical mixture in step b. further comprises about 10 to about 20% by weight of L-ascorbic acid.

16. The fresh vegetable product according to claim 13, wherein the vegetables are selected from the group consisting of carrots, onions, green beans, peppers and celery.

17. A fresh potato product for consumption or further processing made by a process comprising the steps of:
 a. cleaning fresh potatoes;
 b. optionally peeling the fresh, cleaned potatoes while they are substantially completely covered by water;
 c. passing the fresh potatoes to a vessel for additional peeling and cleaning, while they are substantially completely covered by water;
 d. contacting the fresh potatoes with a concentrated aqueous solution comprising a chemical mixture comprising sodium acid pyrophosphate, calcium chloride and/or a calcium chloride/ magnesium chloride mixture, citric acid, L-ascorbic acid, sodium bisulfite and potassium sorbate;
 e. washing the fresh potatoes;
 f. at least partially drying the fresh potatoes; and
 g. packaging the fresh potatoes to obtain the fresh potato product for consumption or further processing.

18. The fresh potato product according to claim 17, wherein the chemical mixture in step d. comprises about 25 to about 68% by weight of sodium acid pyrophosphate, about 5 to about 25% by weight of calcium chloride, about 5 to about 25% by weight of citric acid, about 2 to about 20% by weight of L-ascorbic acid, about 0.5 to about 10% by weight of sodium bisulfite and about 2 to about 15% by weight of potassium sorbate.

19. The fresh potato product according to claim 17, which is produced by a process further comprising a step b1., between the steps b and c., including subdividing the fresh potatoes while they are substantially completely covered by a diluted aqueous solution of a chemical mixture comprising about 0.08 to about 0.3% by weight of a chemical mixture including sodium acid pyrophosphate, calcium chloride, citric acid, L-ascorbic acid, sodium bisulfite and potassium sorbate.

20. The fresh potato product according to claim 17, wherein the chemical mixture in step b1. comprises:
about 25 to about 68% by weight of sodium acid pyrophosphate;
about 5 to about 25% by weight of calcium chloride;
about 5 to about 25% by weight of citric acid;
about 2 to about 20% by weight of L-ascorbic acid;
about 0.5 to about 10% by weight of sodium bisulfite;
about 2 to about 15% by weight of potassium sorbate.

21. The fresh potato product according to claim 17, wherein the process is conducted at a temperature of about 33° to about 55° F.

22. The fresh potato product according to claim 17, wherein the product is stored at a temperature of about 33° to about 50° F.

23. A process of manufacturing a fresh potato product for consumption or further processing, comprising the steps of:
   a. cleaning fresh potatoes;
   b. optionally peeling the fresh, cleaned potatoes while they are substantially completely covered by water;
   c. passing the fresh potatoes to a vessel for additional optional peeling and cleaning, while they are substantially completely covered by water;
   d. contacting the fresh potatoes with a concentrated aqueous solution comprising about 2 to about 12% by weight of a chemical mixture comprising sodium acid pyrophosphate and/or disodium acid pyrophosphate, calcium chloride and/or calcium chloride/magnesium chloride mixture, citric acid, L-ascorbic acid and potassium sorbate;
   e. washing the fresh potatoes;
   f. at least partially drying the fresh potatoes; and
   g. packaging the fresh potatoes to obtain the fresh potato product suitable for consumption or further processing.

24. The process according to claim 23, which further comprises a step b1., between the steps b and c., comprising subdividing the fresh potatoes while they are substantially completely covered by a diluted aqueous solution of a chemical mixture comprising about 0.08 to about 0.3% by weight of a chemical mixture including sodium acid pyrophosphate, calcium chloride, citric acid, L-ascorbic acid and potassium sorbate.

25. The process according to claim 24, wherein the chemical mixture in step b1. comprises:
about 25 to about 68% by weight of sodium acid pyrophosphate;
about 5 to about 25% by weight of calcium chloride;
about 5 to about 25% by weight of citric acid;
about 2 to about 20% by weight of L-ascorbic acid; and
about 2 to about 15% by weight of potassium sorbate.

26. The process according to claim 23, wherein the chemical mixture in step b. comprises about 25 to about 68% by weight of sodium acid pyrophosphate, about 5 to about 25% by weight of calcium chloride, about 5 to about 25% by weight of citric acid, about 2 to about 20% by weight of L-ascorbic acid and about 2 to about 15% by weight of potassium sorbate.

* * * * *